United States Patent [19]

Mizuno et al.

[11] Patent Number: 4,753,318
[45] Date of Patent: Jun. 28, 1988

[54] ENGINE NOISE CONTROL DEVICE FOR USE IN AUTOMOBILES OR THE LIKE

[75] Inventors: Keiichiro Mizuno; Kazuyoshi Iida; Kazuo Kondo, all of Yokohama, Japan

[73] Assignee: Bridgestone Corporation, Tokyo, Japan

[21] Appl. No.: 660,995

[22] Filed: Oct. 15, 1984

[30] Foreign Application Priority Data

Oct. 18, 1983 [JP] Japan .................. 58-194855

[51] Int. Cl.⁴ .................................. F01N 1/06
[52] U.S. Cl. ........................ 181/204; 181/206
[58] Field of Search ................. 181/202–205, 181/198, 210, 284, 258

[56] References Cited

U.S. PATENT DOCUMENTS 3,762,489 10/1973 Proksch et al. ............. 181/204 X
4,156,476  5/1979 Matsumoto et al. .......... 181/210
4,299,305 11/1981 Eriksson ................. 181/258 X

FOREIGN PATENT DOCUMENTS

0068410  1/1983 European Pat. Off. .
2920278  1/1981 Fed. Rep. of Germany .
2312831 12/1976 France .
2382736  9/1978 France .
2479324 10/1981 France .

Primary Examiner—Benjamin R. Fuller
Attorney, Agent, or Firm—Sughrue, Mion, Zinn, Macpeak, and Seas

[57] ABSTRACT

Disclosed herein is an engine noise control device for use in automobiles or the like comprising a noise control member which is attached to an opening of an engine room of an automobile or the like. The noise control member has a plurality of hollow conduit passages penetrating from one of surfaces to the other surface thereof. The hollow conduit passages are so arranged that the length of the conduit passages becomes shorter from the central portion to the peripheral portion of the noise control member. Thereby, a noise-propagating direction is changed by controlling the noise to reduce the energy of sounds radiated and/or diffracted to the outside.

26 Claims, 7 Drawing Sheets

FIG_3

FIG.4

FIG_5

FIG_14

FIG_15  FIG_16  FIG_17

ENGINE NOISE CONTROL DEVICE FOR USE IN AUTOMOBILES OR THE LIKE

BACKGROUND OF THE INVENTION

(1) Field of the Invention:

The present invention relates to an engine noise control device for use in the automobiles or the like which is a countermeasure against noise pollution. In particular, this invention relates to a device to reduce the engine noise radiated and/or diffracted to the outside from the engine compartment of the automobiles or the like.

Figure 1:
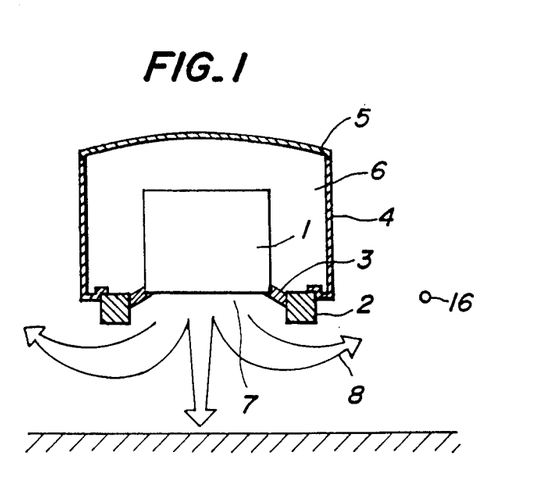
FIG. 1 is a diagrammatic vertically sectional view of an engine compartment of an automobile.

(2) Description of the Prior Art:

In general, as shown in FIG. 1, an engine 1 of the automobile and the like is fitted onto frame side members 2 through mounts 3, and placed in an engine compartment 6 surrounded by a body 4 and a bonnet 5. The engine compartment 6 is opened to the atmosphere through an engine compartment opening 7 at the bottom portion of the engine compartment for radiating heat generated from the engine and so on. Thus, noise (non-controlled sound waves) generated from the engine 1 is radiated and/or diffracted to the outside from the engine compartment opening 7 as shown by a reference numeral 8, thereby causing noise pollution.

If the engine compartment opening is completely closed, such engine noises can be reduced to a large extent. However, since the engine compartment opening must not be closed for the above-mention reason, conventionally, a sound absorbing material has merely been sticked to the inner surface of the bonnet 5 and the other inner wall of the engine compartment 6, so that a large noise-reducing effect can not be obtained.

SUMMARY OF THE INVENTION

In view of the above problems, an object of the present invention is to provide an engine noise control device for use in the automobile or the like, in which a noise-propagating direction is changed by controlling the noises to reduce the energy of sounds radiated and/or diffracted to the outside.

It is another object of the present invention to provide an engine noise control device for use in the automobile or the like, in which a destructive interference effect is induced due to the displacement in phase between controlled sound waves and non-controlled sound waves to reduce the noise to the outside of the automobile to a large extent.

In order to attain the above objects of the present invention, the engine noise control device comprises a noise control member which is attached to the engine compartment opening and has a plurality of hollow conduit passages penetrating from one of the surfaces of the noise control member to the other surface, and the hollow conduit passages are so arranged that the length of the conduit passages becomes shorter from the central portion to the peripheral portion thereof, whereby the noises radiated from a noise source are controlled in such a direction as to lower the energy of the sounds propagating to the outside of the engine compartment, thereby reducing the noises.

According to another aspect of the invention, there is a provision of the engine control device in which a part of noises propagating from a noise source is passed through a plurality of hollow conduit passages having differences in the conduit passage length to control the lengths of the propagating paths of the noises passed through the hollow conduit passages, as described in Japanese Patent Publication No. 42,728/1979, whereby the phase of the noises is displaced to induce the destructive interference phenomenon due to the interference between the controlled noises and the directly propagating non-controlled noises, thereby reducing the noises to a large extent.

These and other objects, features, and advantages of the present invention will be well appreciated upon reading of the following description of the invention when considered in connection with the attached drawings with understanding that some modifications, variations, and changes could be easily made by the skilled in the art to which the invention pertains without departing from the spirit of the invention or the scope of the claims appended hereto.

DETAILED DESCRIPTION OF THE INVENTION

Figure 2:
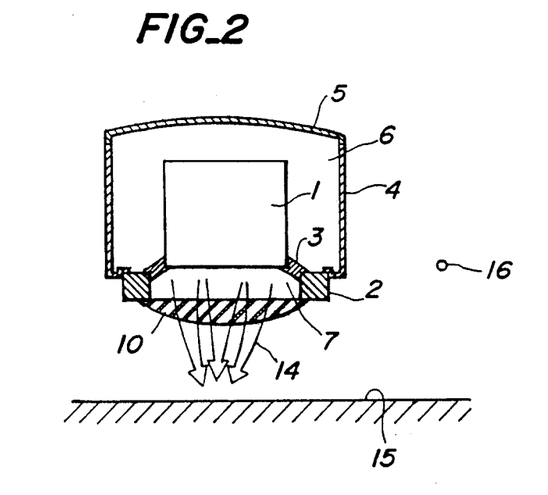
FIG. 2 is a diagrammatic vertically sectional view of an engine compartment similar to that in FIG. 1 but to which a noise control device according to the present invention is attached.

The invention will be explained more in detail with reference to the preferred embodiments of the invention which are merely illustrative of the invention, but not interpreted to limit the scope thereof;

FIG. 2 shows an embodiment in which a convex lens shape noise control member 10 is attached to side members 2 such that the noise control member may be positioned in an engine compartment opening 7 at the bottom portion of the engine room 6.

Figure 3:
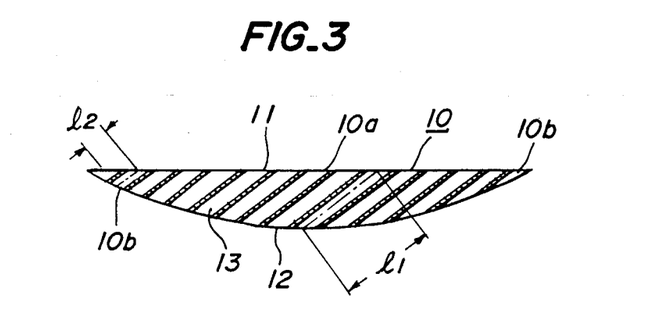
FIG. 3 is a vertically sectional view of a convex lens shape noise control member.

As shown in FIG. 3, the convex lens shaped noise control member 10 has a plurality of conduit passages having differences in the conduit passage length and penetrating from the one surface 11 to the other surface 12 of the noise control member, and the conduit passages 13 are arranged in parallel to one another such that the conduit passage length becomes shorter from the central portion 10a to the peripheral portion 10b of the noise control member as shown by the conduit passage lengths $l_1$ and $l_2$.

Figure 4:
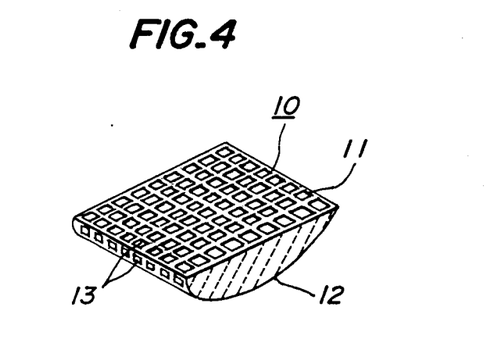
FIG. 4 is a perspective view of the convex lens shape noise control member shown in FIG. 3.
Figure 5:
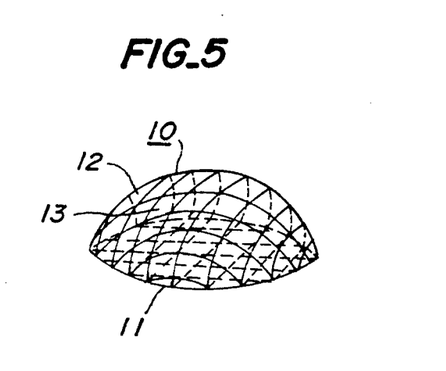
FIG. 5 is a bottom perspective view of another embodiment of the convex lens shape noise control member.

It is preferable that the convex lens shape noise control member 10 is so designed that the one surface 11 is a flat plane and the other surface 12 is a half cylindrical convex lens shape forming an arch, or a semi-circular shape as shown in FIG. 4, or as shown in FIG. 5, the one surface 11 is a flat plane and the other surface 12 is a semi-spherical convex lens shape forming a part of a sphere. Alternatively, the other surface 12 may be shaped in other convex lens shape than these shown in the drawings.

When the convex lens shape noise control member thus constituted is attached to the engine compartment opening 7, the noises generated by the engine and so on in the engine compartment 6 enter the convex lens shape noise control member 10 from the flat incident surface 11 and are passed through the interior of a plurality of the hollow conduit passages 13 having different conduit passage lengths respectively, so that the phases are displaced, and the noises are radiated from the sound wave radiation surface 12 of a convex surface shape. The destructive interference is induced between the controlled sounds with the phases thus displaced and the non-controlled and directly propagating sounds which are directly radiated and/or diffracted from the interior of the engine compartment 6 to the outside of the engine room through the space or another opening (not shown) present at the engine compartment opening 7. Consequently, the noises are reduced and directed to the radiation surface 12 of the convex lens shape sound control member 10 toward the ground surface 15 as shown by arrows 14 in FIG. 2, so that the energy of the sounds is directed to the central portion under the chassis, and the degree at which the noises dissipate to the peripheral portion becomes smaller. Accordingly, the noise level at a position such as a noise-receiving position 16 located at the outside periphery of the engine compartment 6 can be remarkably lowered, whereas heat generated by the engine, water entering the engine compartment, or the like can be dissipated or discharged to the outside through the hollow conduit passages 13.

Figure 6:
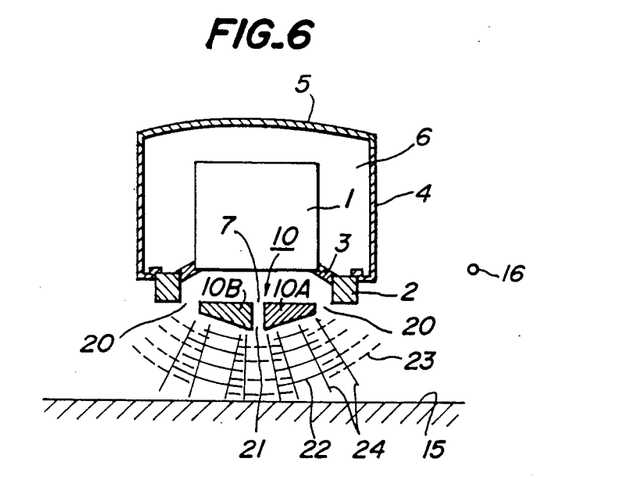
FIG. 6 is a diagrammatic vertical sectional view of still another embodiment according to the present invention.

FIG. 6 shows another embodiment according to the present invention. In this embodiment, the noise control member 10 is divided into two portions 10A and 10B on the central line thereof, which are fitted side by side at the engine compartment opening 7 by means of an appropriate support frame (not shown) such that they are spaced from the frame side members 2 and spaced at a given distance from each other. Thereby, spaces 20 and 21 are defined among the side frame members 2 and the divided portions 10A and 10B, whereby a part of the noise in the engine compartment 6 is directly radiated and/or diffracted to the outside of the engine compartment to be propagated.

Figure 7:
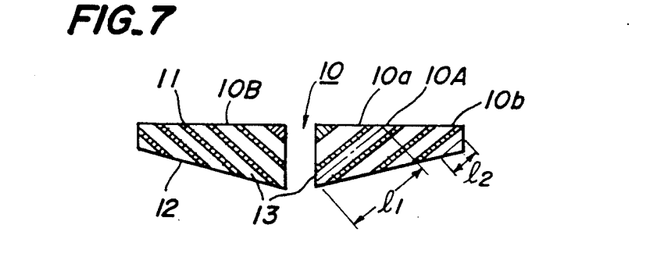
FIG. 7 is a vertically sectional view of the noise control member shown in FIG. 6.
Figure 8:
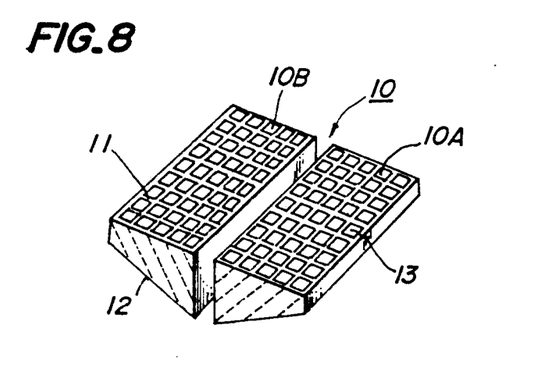
FIG. 8 is a perspective view of the noise control member shown in FIG. 6.

As shown in FIGS. 7 and 8, a plurality of hollow conduit passages 13 having differences in the conduit passage length are arranged in parallel to one another in the each of the portions 10A and 10B of the noise control member in such a manner that the conduit passages penetrate from the incident surface 11 to the radiation surface 12 and the length of the conduit passages becomes shorter from the central portion 10a positioned in the central portion to the peripheral portion 10b of the engine compartment opening 7.

According to the engine noise control device according to the second embodiment, as shown in FIG. 6, the controlled sound waves the phases of which are displaced while passing through the hollow conduit passages 13 at the portions 10A and 10B of the noise control member are propagated from the radiation surface 12 to the ground surface 15 as shown by solid lines 22. On the other hand, the non-controlled sound waves directly radiated and/or diffracted to the outside of the engine compartment through the spaces 20 and 21 are propagated as shown by broken lines 23. Consequently, interference regions are formed as shown by dotted lines 24.

Figure 9:
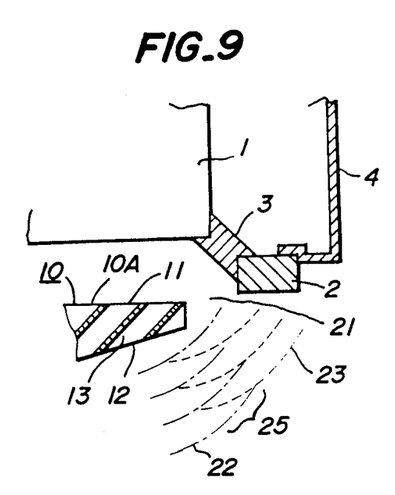
FIG. 9 is a detailed view of an interfering portion between controlled sound waves and non-controlled sound waves in the embodiment shown in FIG. 6.
Figure 10:
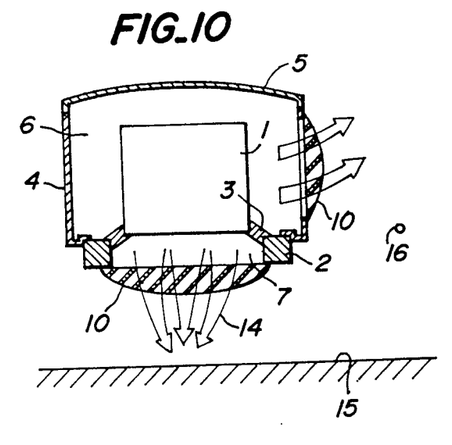
FIGS. 10-14 are diagrammatic vertically sectional views of engine rooms similar to the embodiment in FIG. 2, which illustrate another embodiment according to the present invention.
Figure 11:
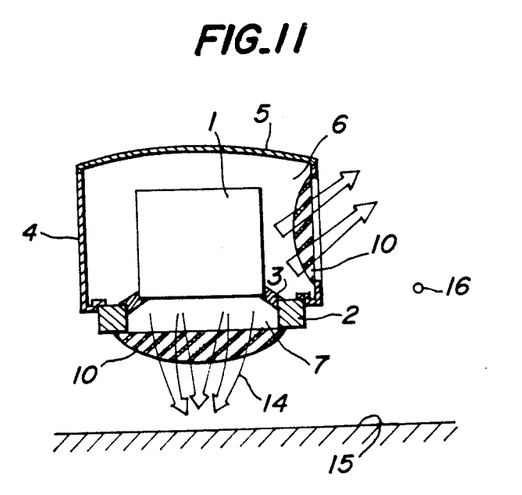
Figure 12:
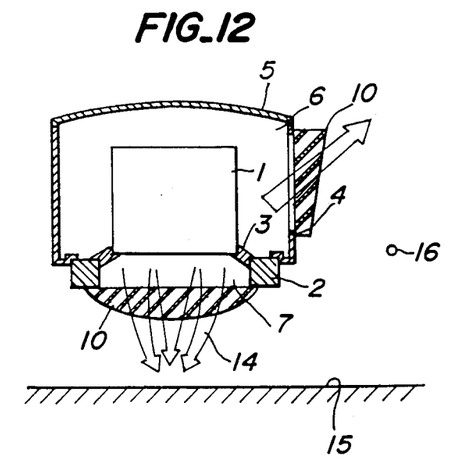
Figure 13:
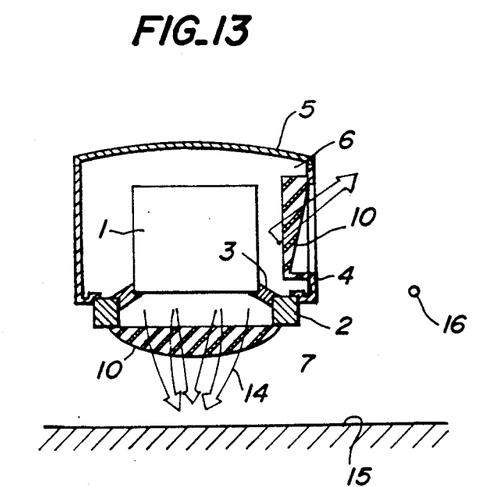
Figure 14:
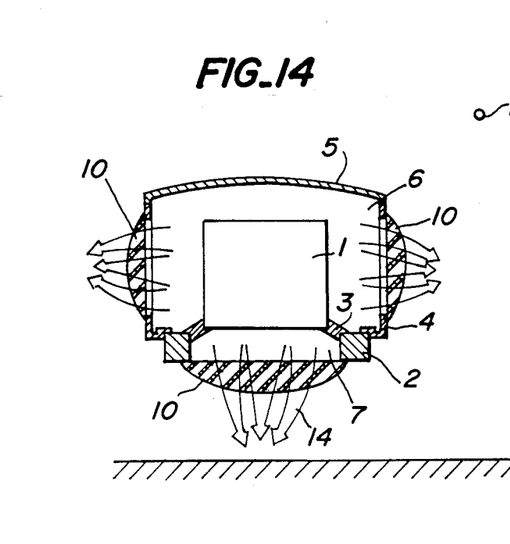

FIG. 9 shows the detail of the interference portion between the controlled sound waves 22 passing through the portion 10A of the noise control member and the non-controlled sound waves 23 radiated and/or diffracted from the space 21 between the frame side member 2 and the portion 10A of the noise control member. The interfered waves are shown by 25.

FIGS. 10 to 14 show various other embodiments according to the present invention in which a convex lens shape or prism shape noise control member 10 is attached to a side body 4 of the engine compartment 6. By so doing, not only the convex lens shape but also the prism shape may be employed as the noise control member 10 attached to the side body 4 of the engine room 6. As shown in these figures, the noise generated from the engine compartment 6 can be refracted to a direction other than the sound receiving point as shown by the arrow direction by use of the noise control members 10.

Desired differences in conduit passage length can be obtained even within a restricted thickness by disposing a plurality of small obstacles in the interiors of the hollow conduit passages 13 of the noise control member 10 and increasing the number of the obstacles from the peripheral portion to the central portion 10b.

Figure 15:
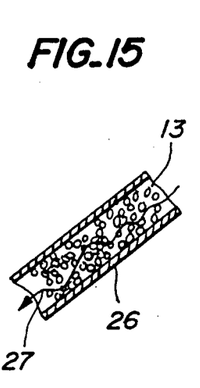
FIGS. 15-17 are diagrammatic views illustrating various embodiments according to the present invention in which small obstacles are placed in hollow conduit passages.
Figure 16:
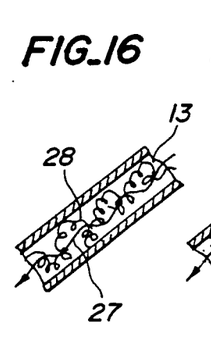
Figure 17:
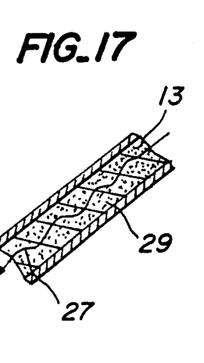

FIGS. 15–17 show various embodiments in which small obstacles are disposed in the interiors of the hollow conduit passages 13. FIG. 15 is an embodiment in which fine particles 26 are charged into the hollow conduit passages 13. FIG. 16 is an embodiment in which rigid fibrous material 28 is charged into the hollow conduit passages 13. FIG. 17 is an embodiment in which a porous material 29 such as ceramic foam is charged to form roundabout space passages 27. By disposing the small obstacles in the hollow passages as mentioned above, the length of sound-propagation paths becomes larger in the case of the thinner noise control member to increase the control performance of the low frequency wave.

As the material constituting the noise control member, any material including metal and polymer material may be used so long as it has a certain sound insulating performances.

The invention will be described more in detail with reference to the following example.

Figure 18:
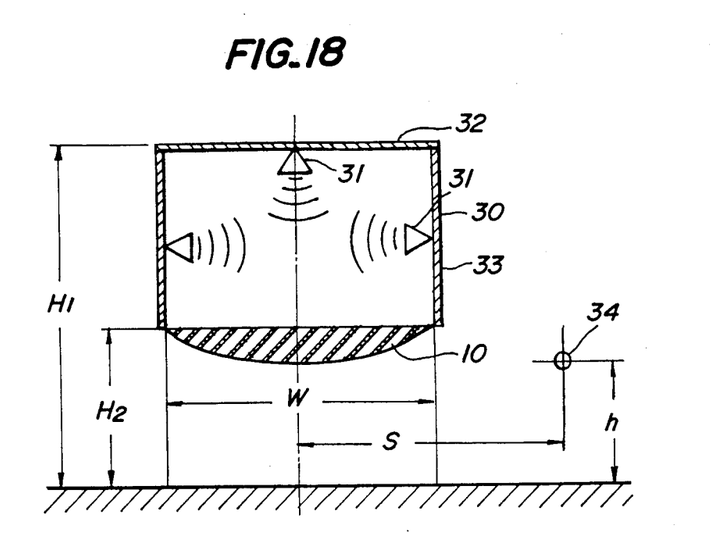
FIG. 18 is a diagrammatic view illustrating an experimental model device.

FIG. 18 shows a diagrammatical view of an experimental device which was used in a laboratory test by employing an engine compartment model of an automobile. In the figure, a reference numeral 30 is a wood box corresponding to the chassis of the automobile, and a reference numeral 31 a sound source speaker producing a white noise, which is attached to the interior of a top wall 32 and a side wall 33. The convex lens shape noise control member 10 is fitted to the lower end of the side wall 33. The width W of the wood box 30 was 1,000 mm, the height $H_1$ from the ground surface to the top wall 32 was 1,100 mm and the height $H_2$ from the ground surface to the lower end of the side wall 33 was 500 mm.

Figure 19:
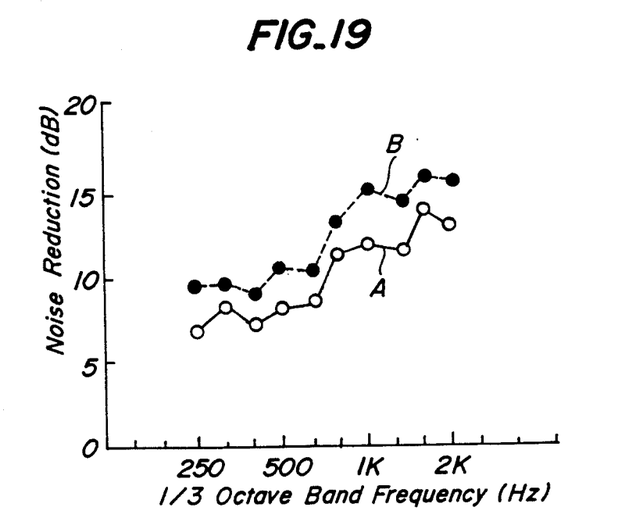
FIG. 19 is a graph showing experimental results obtained by the experimental model device.

A sound receiver 34 is disposed at a position of a horizontal distance S from the central line of the wood box 17 and a height h from the ground surface, and the white noises were outputted from the speaker 31. The sound pressure level was measured by the microphone 34 with respect to cases where the noise control member was installed or no noise control member was installed, and the noise reduction effects by the noise control member 10 were obtained as shown in FIG. 19. In this figure, A is a case in which the noise control member of the embodiment shown in FIG. 2 was used, and B is a case in which the noise control member of the embodiment shown in FIG. 6 was employed.

From the results, it was confirmed that the considerable noise reduction effect can be obtained from a low frequency to a high frequency by the noise control member according to the present invention.

As mentioned above, the present invention has the effects that noises radiated to the outside from the engine compartment can be significantly reduced, while heat radiation and water discharge are not interrupted.

What is claimed is:

1. An engine noise control device comprising: an opening in a bottom of a vehicle engine compartment comprising a sound sealed structure except for said opening; a noise control member attached to said opening of the engine compartment and having a noise entering surface and a noise ejecting surface, said noise control member being provided with a plurality of hollow conduit passages penetrating from the noise entering surface to the noise ejecting surface of the noise control member, wherein the hollow conduit passages are so arranged that the length of the conduit passages becomes shorter from a central portion to a peripheral portion thereof.

2. An engine noise control device according to claim 1, wherein the conduit passages are obliquely arranged in parallel to one another and the horizontal sectional profile thereof is in a lattice fashion.

3. An engine noise control device according to claim 2, wherein the noise control member is a half cylindrical convex lens shape.

4. An engine noise control device according to claim 2, wherein the noise control member is a semispherical shape.

5. An engine noise control device according to claim 2, wherein small obstacles are disposed in the interiors of the conduit passages.

6. An engine noise control device according to claim 5, wherein the small obstacles are made of one selected from the group consisting of fine particle, rigid fibrous material, and porous material.

7. An engine noise control device according to claim 1, wherein the noise control member is a half cylindrical convex lens shape.

8. An engine noise control device according to claim 1, wherein the noise control member is a semispherical shape.

9. An engine noise control device according to claim 1, wherein small obstacles are disposed in the interiors of the conduit passages.

10. An engine noise control device according to claim 9, wherein the small obstacles are made of one selected from the group consisting of fine particle, rigid fibrous material, and porous material.

11. An engine noise control device comprising: a noise control member attached to an opening of an engine room of a motor vehicle and having a noise entering surface and a noise ejecting surface, said noise control member being provided with a plurality of hollow conduit passages penetrating from the noise entering surface to the noise ejecting surface of the noise control member, said hollow conduit passages being arranged so that the lengths of the conduit passages become shorter from a central portion to a peripheral portion thereof; and a space through which noise can directly propagate to the outside of a compartment formed at the engine room opening at which the noise control member is attached, whereby sounds controlled by passage through the hollow conduit passages of the noise control member and other sounds radiated and/or diffracted from the interior of the engine room induce destructive interference.

12. An engine noise control device according to claim 11, wherein the noise control member is divided into two portions and the space is formed therebetween.

13. An engine noise control device according to claim 12, wherein a space is further defined between each of the two portions of the noise control member and frame side members which are attached to the opening of the engine room and support an engine in the engine compartment.

14. An engine noise control device according to claim 11, wherein small obstacles are disposed in the interior of the conduit passages.

15. An engine noise control device according to claim 14, wherein the small obstacles are made of one selected from the group consisting of fine particle, rigid fibrous material, and porous material.

16. An engine noise control device according to claim 14, wherein the number of the obstacles is increased from the peripheral portion to the central portion.

17. An engine noise control device according to claim 14, wherein the obstacles are adapted to enhance the control performance of low frequency wave lengths.

18. An engine noise-controlling device comprising: a sound-sealed engine compartment of a vehicle, an opening in a bottom of the engine compartment, and a noise control device attached to cover the opening, wherein said noise control device comprises a noise control member attached to said opening of the engine compartment of the vehicle and having a noise entering surface and a noise ejecting surface, and noise control member being provided with a plurality of hollow conduit passages penetrating from the noise entering surface to the noise ejecting surface of the noise control member, the hollow conduit passages being so arranged that the length of the conduit passages becomes shorter from a central portion to a peripheral portion thereof.

19. An engine noise-insulating device comprising: a bonnet, side bodies and side frame members attached to the lower ends of the side bodies which constitute a sound-sealed engine compartment with an opening defined between the side frame members and being provided in a bottom of the engine compartment, an engine mounted on the side frame members by way of mounts attached to the respective side frame members, a noise-control device attached to the side frame members to cover the opening, wherein said noise control device comprises: a noise control member which is attached to the opening of the engine compartment of the vehicle and has a noise entering surface and a noise ejecting surface, said noise control member being provided with a plurality of hollow conduit passages penetrating from the noise entering surface to the noise ejecting surface of the noise control member, the hollow conduit passages being so arranged that the length of the conduit passages becomes shorter from a central portion to a peripheral portion thereof.

20. An engine noise control device according to claim 19, further comprising an opening in one of said side bodies, a second noise control member attached to said opening in one of said side bodies, said second noise control member having a noise entering surface and a noise ejecting surface, said second noise control member being provided with a plurality of hollow conduit passages penetrating from the noise entering surface to the noise ejecting surface and being so arranged that the length of the conduit passages becomes shorter from a central portion to a peripheral portion thereof.

21. An engine noise control device of claim 20, wherein said second noise control member is a half cylindrical convex lens shape.

22. An engine noise control device according to claim 20, wherein said second noise control member is mounted on said side body having said opening on the inside thereof to cover said opening.

23. An engine noise control device according to claim 20, wherein said second noise control member is mounted on said side body having said opening on the outside thereof to cover said opening.

24. An engine noise control device according to claim 20, wherein said second noise control member is trapezoidal in shape.

25. An engine noise control device according to claim 20, further comprising an opening in the other of said side bodies, a third noise control member attached to said opening in the other of said side bodies, said third noise control member having a noise entering surface and a noise ejecting surface, said third noise control member being provided with a plurality of hollow conduit passages penetrating from the noise entering surface to the noise ejecting surface and being so arranged that the length of the conduit passages becomes shorter from a central portion to a peripheral portion thereof.

26. The engine noise control device of claim 25, wherein said second and third noise control members are half cylindrical convex lens shapes.

* * * * *